United States Patent
Wang et al.

(10) Patent No.: US 10,963,575 B2
(45) Date of Patent: *Mar. 30, 2021

(54) ACCESS CONTROL GOVERNANCE USING MAPPED VECTOR SPACES

(71) Applicant: FMR LLC, Boston, MA (US)

(72) Inventors: Sean Wang, Coppell, TX (US); Paulina Li, Dalian (CN); Han Zhou, Centreville, VA (US); Chad Renfro, Waxahachie, TX (US); Daniel Shnowske, Carrollton, TX (US); Sean Catlett, Dallas, TX (US)

(73) Assignee: FMR LLC, Boston, MA (US)

( * ) Notice: Subject to any disclaimer, the term of this patent is extended or adjusted under 35 U.S.C. 154(b) by 351 days.

This patent is subject to a terminal disclaimer.

(21) Appl. No.: 16/130,352

(22) Filed: Sep. 13, 2018

(65) Prior Publication Data

US 2019/0251274 A1    Aug. 15, 2019

Related U.S. Application Data

(63) Continuation of application No. 15/673,328, filed on Aug. 9, 2017, now Pat. No. 10,089,480.

(51) Int. Cl.
| | |
|---|---|
| *G06F 7/00* | (2006.01) |
| *G06F 21/60* | (2013.01) |
| *H04L 29/06* | (2006.01) |
| *G06F 21/31* | (2013.01) |
| *G06F 21/41* | (2013.01) |

(Continued)

(52) U.S. Cl.
CPC ............ *G06F 21/604* (2013.01); *G06F 21/31* (2013.01); *G06F 21/41* (2013.01); *G06F 21/577* (2013.01); *G06F 21/606* (2013.01); *H04L 63/10* (2013.01); *H04L 63/102* (2013.01); *H04L 63/104* (2013.01); *H04L 63/1433* (2013.01); *G06F 21/6245* (2013.01); *H04L 63/0236* (2013.01)

(58) Field of Classification Search
CPC ..................................................... G06F 21/604
USPC ............................................................ 707/783
See application file for complete search history.

(56) References Cited

U.S. PATENT DOCUMENTS

| | | | |
|---|---|---|---|
| 5,388,196 A * | 2/1995 | Pajak ...................... | G06F 16/93 715/751 |
| 6,922,699 B2 | 7/2005 | Schuetze et al. | |
| 8,140,476 B2 | 3/2012 | Aharoni et al. | |

(Continued)

*Primary Examiner* — Eliyah S. Harper
(74) *Attorney, Agent, or Firm* — Proskauer Rose LLP (57) ABSTRACT

Methods and apparatuses are described for enterprise access control governance in a computerized information technology (IT) architecture. A server generates a first vector space, each node in the first space representing a user of resources in the IT architecture and including attributes of the user. The server generates a second vector space, each node in the second space representing an entitlement to access resources in the IT architecture and including attributes of the entitlement. The server creates an entitlement utility matrix by mapping nodes in the first space to nodes in the second space. The server determines a set of recommended entitlements for a plurality of users based upon the utility matrix. The server determines a discrepancy between the set of recommended entitlements for a first user and a set of existing entitlements for the first user and adjusts the set of existing entitlements based upon the discrepancy.

20 Claims, 5 Drawing Sheets

(51) Int. Cl.
    *G06F 21/57*     (2013.01)
    *G06F 21/62*     (2013.01)

(56) References Cited

U.S. PATENT DOCUMENTS

| | | |
|---|---|---|
| 8,225,416 B2 | 7/2012 | Richards et al. |
| 8,972,312 B2 | 3/2015 | Rachevsky et al. |
| 9,147,055 B2 * | 9/2015 | Baikalov .............. H04L 63/102 |
| 9,456,012 B2 | 9/2016 | Cohen |
| 9,563,720 B2 | 2/2017 | Carbonell et al. |
| 9,977,810 B2 | 5/2018 | Goel et al. |
| 10,691,757 B1 * | 6/2020 | Chen .................... H04L 63/101 |
| 2002/0078004 A1 * | 6/2002 | Ambrosini .......... H04L 61/1523 |
| 2006/0124734 A1 * | 6/2006 | Wallerstorfer ......... G07C 9/253 |
| | | 235/382 |
| 2008/0052102 A1 | 2/2008 | Taneja et al. |
| 2011/0145291 A1 | 6/2011 | Aharoni et al. |
| 2012/0047575 A1 | 2/2012 | Bailakov et al. |
| 2013/0227638 A1 * | 8/2013 | Giambiagi ............. G06F 21/00 |
| | | 726/1 |
| 2013/0246470 A1 | 9/2013 | Price et al. |
| 2016/0072815 A1 * | 3/2016 | Rieke ................. H04L 63/1433 |
| | | 726/3 |
| 2019/0207946 A1 | 7/2019 | Mertens et al. |

\* cited by examiner

ACCESS CONTROL GOVERNANCE USING MAPPED VECTOR SPACES

RELATED APPLICATIONS

This application is a continuation of U.S. patent application Ser. No. 15/673,328, filed on Aug. 9, 2017, the entirety of which is incorporated herein by reference.

TECHNICAL FIELD

This application relates generally to methods and apparatuses, including computer program products, for access control governance using mapped vector spaces.

BACKGROUND

A basic objective of information technology (IT) access control is to facilitate access to computing resources for authorized users and to deny access for unauthorized users. Enterprises of all sizes today face tremendous challenges in governing access control, including the difficulty for current IT access control systems and processes in scaling up and staying up-to-date with the most accurate access control parameters and profiles. In particular, maintaining the appropriate level of access to IT resources based on, e.g., job roles and related functions can become impractical due to the dynamic and global nature of today's workforce and the ever-shrinking lifecycle of IT resources. Entitlement to IT resources changes constantly and often loses its original or intended meaning.

The above challenges have some undesired consequences. First, governing access control inevitably involves processes that require heavy manual intervention to keep up with changes in both the user attributes and resource attributes. Secondly, as users move within the organization and change status or job functions, their access profiles do not typically change quickly enough to reflect their new status, resulting in weakened security control against unauthorized access. In the worst-case scenario, neither the users themselves nor the people who review and grant access understand what the entitlement actually means.

SUMMARY

Therefore, methods and systems are needed to generate IT access control recommendations and implement IT access control policies in a scalable and automated manner. The techniques described herein advantageously leverage a plurality of computer-generated vector spaces that are mapped together to both understand and visualize the range of existing access control entitlements attributed to individuals in a particular organization, as well as to automatically implement IT access control entitlement changes on a per-user and enterprise-wide scale. In particular, the visualization aspect of the present invention provides a clear and efficient view of the IT access control entitlements so that administrators can quickly identify users who may have access control entitlements that differ from peers in similar jobs and roles, and so that administrators can determine whether any users have entitlements that pose a significant risk to the security of the enterprise IT systems. In addition, the methods and systems provide an automated system to remedy any potential discrepancies in order to maintain a fully secure IT system.

The techniques described herein provide several important advantages for the entire computerized lifecycle management for enterprise access control and governance. First, the mapped vector spaces of users and entitlements can be used alongside of any centralized access request and approval system by recommending and presenting to the end users the most relevant access entitlements. This helps to jump start access entitlement for new users as well as transferring users. Because user attributes are typically well known within an enterprise, the systems and methods described herein avoid the shortcomings related to the so-called "cold start" issue common to existing recommender systems. The systems and methods described herein can also be used for automatically mining the mapped vector space to identify access entitlements that are deemed low risks to improve overall efficiency via automated entitlement fulfillment and provisioning. Lastly, the techniques described herein can be used to improve the effectiveness of computerized access entitlement audit and reviews by either interactively visualizing of the mapped vector space or non-interactive processing in the background as batch-mode operations to modify user entitlements to achieve conformity to security policies The invention, in one aspect, features a system for enterprise access control governance in a computerized information technology (IT) architecture. The system includes a server computing device that generates a first vector space comprising a plurality of nodes, each node in the first vector space representing a user of one or more computing resources in the IT architecture and including one or more attributes of the user. The server computing device generates a second vector space comprising a plurality of nodes, each node in the second vector space representing an entitlement to access one or more computing resources in the IT architecture and including one or more attributes of the entitlement. The server computing device creates an entitlement utility matrix by mapping one or more nodes in the first vector space to one or more nodes in the second vector space based upon existing user entitlements to access computing resources in the IT architecture. The server computing device determines a set of recommended access control entitlements for each of a plurality of users based upon the entitlement utility matrix. The server computing device determines a first discrepancy between the set of recommended access control entitlements for a first user and a set of existing user entitlements for the first user. The server computing device adjusts the set of existing user entitlements for the first user based upon the first discrepancy.

The invention, in one aspect, features a method of enterprise access control governance in a computerized information technology (IT) architecture. A server computing device generates a first vector space comprising a plurality of nodes, each node in the first vector space representing a user of one or more computing resources in the IT architecture and including one or more attributes of the user. The server computing device generates a second vector space comprising a plurality of nodes, each node in the second vector space representing an entitlement to access one or more computing resources in the IT architecture and including one or more attributes of the entitlement. The server computing device creates an entitlement utility matrix by mapping one or more nodes in the first vector space to one or more nodes in the second vector space based upon existing user entitlements to access computing resources in the IT architecture. The server computing device determines a set of recommended access control entitlements for each of a plurality of users based upon the entitlement utility matrix. The server computing device determines a first discrepancy between the set of recommended access control entitlements for a first user and a set of existing user entitlements for the first user. The server computing device adjusts the set of existing user entitlements for the first user based upon the first discrepancy.

The invention, in one aspect, features a computer program product, tangibly embodied in a non-transitory computer readable storage device, for enterprise access control governance in a computerized information technology (IT) architecture. The computer program product includes instructions operable to cause a server computing device to generate a first vector space comprising a plurality of nodes, each node in the first vector space representing a user of one or more computing resources in the IT architecture and including one or more attributes of the user. The computer program product includes instructions operable to cause the server computing device to generate a second vector space comprising a plurality of nodes, each node in the second vector space representing an entitlement to access one or more computing resources in the IT architecture and including one or more attributes of the entitlement. The computer program product includes instructions operable to cause the server computing device to create an entitlement utility matrix by mapping one or more nodes in the first vector space to one or more nodes in the second vector space based upon existing user entitlements to access computing resources in the IT architecture. The computer program product includes instructions operable to cause the server computing device to determine a set of recommended access control entitlements for each of a plurality of users based upon the entitlement utility matrix. The computer program product includes instructions operable to cause the server computing device to determine a first discrepancy between the set of recommended access control entitlements for a first user and a set of existing user entitlements for the first user. The computer program product includes instructions operable to cause the server computing device to adjust the set of existing user entitlements for the first user based upon the first discrepancy.

The invention, in another aspect, features a system for enterprise access control governance in a computerized information technology (IT) architecture that provides a plurality of computing resources to a plurality of users. The system comprises a plurality of distributed server computing devices that coordinate over a network environment to generate a first high-dimensional vector space comprising a plurality of nodes, each node in the first high-dimensional vector space representing a user of one or more computing resources in the IT architecture and including one or more attributes of the user. The plurality of distributed server computing devices generate a second high-dimensional vector space comprising a plurality of nodes, each node in the second high-dimensional vector space representing an entitlement to access one or more computing resources in the IT architecture and including one or more attributes of the entitlement. The plurality of distributed server computing devices create an entitlement utility matrix by mapping one or more nodes in the first high-dimensional vector space to one or more nodes in the second high-dimensional vector space based upon existing user entitlements to access computing resources in the IT architecture, wherein each mapping comprises a connection between a node in the first high-dimensional vector space and a node in the second high-dimensional vector space, the connection assigned a value indicating whether access is granted. The plurality of distributed server computing devices determine a set of recommended access control entitlements for each of a plurality of users based upon the entitlement utility matrix, by analyzing existing access control entitlements for one or more other users, the other users associated with the user through a distance value. The plurality of distributed server computing devices determine a first discrepancy between the set of recommended access control entitlements for at least one of the plurality of users and a set of existing user entitlements for that user. The plurality of distributed server computing devices determine a level of security risk to the IT architecture associated with the first discrepancy by the set of existing user entitlements for the user. The plurality of distributed server computing devices generate a visualization graph depicting the level of security risk to the IT architecture associated with the first discrepancy, the visualization graph comparing the set of existing user entitlements in relation to the set of recommended access control entitlements, and display the visualization graph on a display device coupled to the plurality of distributed server computing devices. The plurality of distributed server computing devices adjust the set of existing user entitlements for the at least one of the plurality of users based upon the level of security risk by generating programmatic instructions that are transmitted to each of a plurality of computing resources in an information technology (IT) access control system, wherein each of the plurality of computing resources executes the programmatic instructions to alter data structures that govern user access control entitlements, resulting in a reduced level of security risk for the IT architecture.

The invention, in another aspect, features a computerized method of enterprise access control governance in a computerized information technology (IT) architecture that provides a plurality of computing resources to a plurality of users. A plurality of distributed server computing devices coordinate over a network environment to generate a first high-dimensional vector space comprising a plurality of nodes, each node in the first high-dimensional vector space representing a user of one or more computing resources in the IT architecture and including one or more attributes of the user. The plurality of distributed server computing devices generate a second high-dimensional vector space comprising a plurality of nodes, each node in the second high-dimensional vector space representing an entitlement to access one or more computing resources in the IT architecture and including one or more attributes of the entitlement. The plurality of distributed server computing devices create an entitlement utility matrix by mapping one or more nodes in the first high-dimensional vector space to one or more nodes in the second high-dimensional vector space based upon existing user entitlements to access computing resources in the IT architecture, wherein each mapping comprises a connection between a node in the first high-dimensional vector space and a node in the second high-dimensional vector space, the connection assigned a value indicating whether access is granted. The plurality of distributed server computing devices determine a set of recommended access control entitlements for each of a plurality of users based upon the entitlement utility matrix, by analyzing existing access control entitlements for one or more other users, the other users associated with the user through a distance value. The plurality of distributed server computing devices determine a first discrepancy between the set of recommended access control entitlements for at least one of the plurality of users and a set of existing user entitlements for that user. The plurality of distributed server computing devices determine a level of security risk to the IT architecture associated with the first discrepancy by the set of existing user entitlements for the user. The plurality of distributed server computing devices generate a visualization graph depicting the level of security risk to the IT architecture associated with the first discrepancy, the visualization graph comparing the set of existing user entitlements in relation to the set of recommended access control entitlements, and display the visualization graph on a display device coupled to the plurality of distributed server computing devices. The plurality of distributed server computing devices adjust the set of existing user entitlements for the at least one of the plurality of users based upon the level of security risk by generating programmatic instructions that are transmitted to each of a plurality of computing resources in an information technology (IT) access control system, wherein each of the plurality of computing resources executes the programmatic instructions to alter data structures that govern user access control entitlements, resulting in a reduced level of security risk for the IT architecture.

Any of the above aspects can include one or more of the following features. In some embodiments, when determining the set of recommended access control entitlements for the first user, the server computing device determines a second discrepancy between the set of existing user entitlements for the first user and a set of existing access control entitlements for a group of other users that share at least one attribute with the first user, as represented in the entitlement utility matrix; and generates the set of recommended access control entitlements for the first user based upon the second discrepancy. In some embodiments, the first discrepancy comprises an entitlement in the set of existing user entitlements for the first user that is not included in the set of recommended access control entitlements for the first user. In some embodiments, the first discrepancy comprises an entitlement in the set of recommended access control entitlements for the first user that is not included in the set of existing user entitlements for the first user. In some embodiments, the first discrepancy comprises a difference between a value assigned to an entitlement in the set of existing user entitlements for the first user and a value assigned to an entitlement in the set of recommended access control entitlements for the first user.

In some embodiments, the server computing device identifies one or more access control security risks based upon the first discrepancy. In some embodiments, the server computing devices executes access control workflow instructions in an information technology access control system to adjust the set of existing user entitlements for the first user based upon the identified access control security risks. In some embodiments, the access control workflow instructions comprise one or more of: adding new entitlements to the set of existing user entitlements for the first user, changing one or more values of an entitlement in the set of existing user entitlements for the first user, or removing one or more entitlements from the set of existing user entitlements for the first user.

In some embodiments, the one or more attributes of the user include: a job function of the user, a job role of the user, a title of the user, a manager to which the user is assigned, a business unit to which the user is assigned, and an organization to which the user is assigned. In some embodiments, the one or more attributes of the entitlement include: a name of the entitlement, a description of the entitlement, one or more privileged access flags, an application to which the entitlement is assigned, and a computing system to which the entitlement is assigned.

In some embodiments, the entitlement utility matrix comprises a binary matrix including a value for each user-entitlement combination that indicates whether a user has access to an entitlement. In some embodiments, the server computing device adds a new node to the first vector space, where the new node represents a new user of one or more computing resources in the IT architecture and including one or more attributes of the new user. The server computing device creates an updated entitlement utility matrix by mapping the new node in the first vector space to one or more nodes in the second vector space based upon a set of recommended access control entitlements of another user that shares at least one attribute with the new user. The server computing device determines a set of recommended access control entitlements for the new user based upon the entitlement utility matrix and stores the set of recommended access control entitlements for the new user.

In some embodiments, the server computing device generates a visualization graph depicting the set of existing user entitlements for the first user, the set of recommended access control entitlements for the first user, and the first discrepancy, and displays the visualization graph on a display device coupled to the server computing device. In some embodiments, the server computing device generates a visualization graph depicting existing user entitlements for a plurality of users and one or more discrepancies between the existing user entitlements for the plurality of users and recommended access control entitlements for the plurality of users, and displays the visualization graph on a display device coupled to the server computing device. In some embodiments, the plurality of distributed server computing devices generate a second visualization graph depicting existing user entitlements for a plurality of users and one or more discrepancies between the existing user entitlements for the plurality of users and recommended access control entitlements for the plurality of users, the second visualization graph comprising a plurality of nodes each representing a user of the plurality of users, each node colored to indicate whether the corresponding user's access control entitlements are within an acceptable range of other similar users' access control entitlements, and each node connected to other nodes that correspond to users that have similar access control entitlements; and display the second visualization graph on a display device coupled to the plurality of distributed server computing devices.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
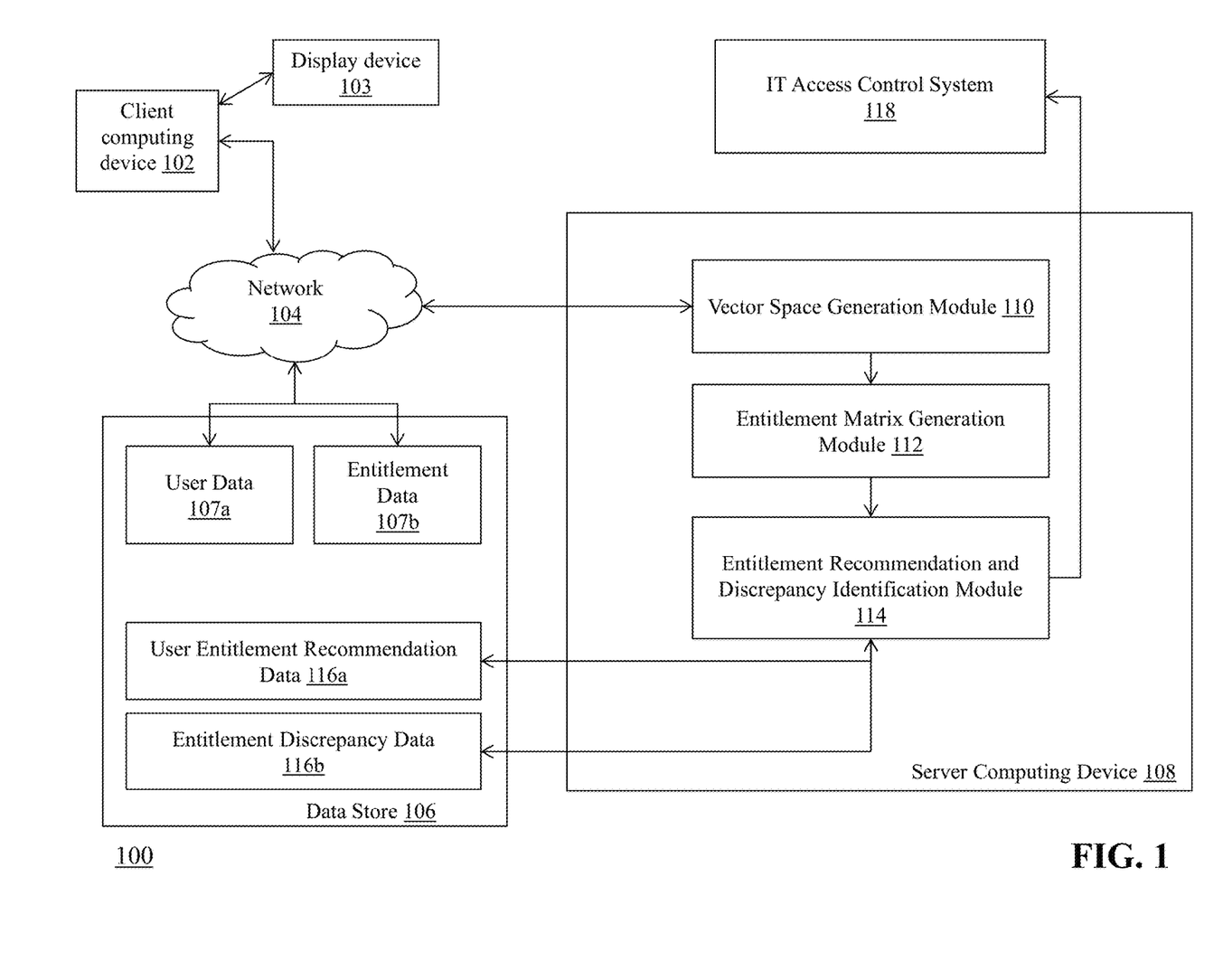
FIG. 1 is a block diagram of a system for enterprise access control governance in a computerized information technology (IT) architecture.

FIG. 1 is a block diagram of a system 100 for enterprise access control governance in a computerized information technology (IT) architecture. The system 100 includes a client computing device 102 that is coupled to a display device 103; a communications network 104; a data store 106 with user data 107a, entitlement data 107b, user entitlement recommendation data 116a, and entitlement discrepancy data 116b; a server computing device 108 having a processor that executes a vector space generation module 110, an entitlement matrix generation module 112 and an entitlement recommendation and discrepancy identification module 114; and an IT access control system 118 coupled to the server computing device 108.

The client computing device 102 connects to the communications network 104 in order to communicate with the server computing device 108 to provide input and receive output relating to the process of enterprise access control governance in a computerized information technology (IT) architecture as described herein. The client computing device 102 is coupled to a display device 103. For example, client computing device 102 can provide a detailed graphical user interface (GUI) via display device 103 that presents output resulting from the methods and systems described herein, where the GUI is utilized by an operator to review IT access control entitlements for a user and/or a group of users and to make adjustments to user entitlements.

Exemplary client devices 102 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single client device 102, it should be appreciated that the system 100 can include any number of client devices. And as mentioned above, in some embodiments the client device 102 also includes a display 103 for receiving data from the server computing device 108 and/or the data store 106 and displaying the data to a user of the client device 102.

The communication network 104 enables the other components of the system 100 to communicate with each other in order to perform the process of enterprise access control governance in a computerized information technology (IT) architecture as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 108 is a combination of hardware, including one or more special-purpose processors and one or more physical memory modules, and specialized software engines that execute on the processor of the server computing device 108, to receive data from other components of the system 100, transmit data to other components of the system 100, and perform functions for enterprise access control governance in a computerized information technology (IT) architecture as described herein. As mentioned above, the processor of the server computing device 108 executes a vector space generation module 110, an entitlement matrix generation module 112, and an entitlement recommendation and discrepancy identification module 114. In some embodiments, the vector space generation module 110 includes programming that comprises, e.g., specific computer learning-based techniques (such as a multi-layered neural network) for use in carrying out the techniques described herein.

In some embodiments, the modules 110, 112, and 114 are specialized sets of computer software instructions programmed onto a dedicated processor in the server computing device 108 and can include specifically-designated memory locations and/or registers for executing the specialized computer software instructions. Further explanation of the specific processing performed by the modules 110, 112, and 114 will be provided below.

The data store 106 is a computing device (or in some embodiments, a set of computing devices) that is coupled to the server computing device 108 and is configured to receive, generate, and store specific segments of data relating to the process of enterprise access control governance in a computerized information technology (IT) architecture as described herein. In some embodiments, all or a portion of the data store 106 can be integrated with the server computing device 108 or be located on a separate computing device or devices. For example, the data store 106 can comprise one or more databases, such as MySQL™ available from Oracle Corp. of Redwood City, Calif. The data store 106 includes user data 107a, entitlement data 107b, user entitlement recommendation data 116a, and entitlement discrepancy data 116b.

The user data 107a is stored by the data store 106 via input from a web site/web page, from a computer file (e.g., XML, CSV, TXT), from an application programming interface (API) coupled to another computing system (e.g., a human resources system), from an application executing on the client device 102 and/or the server computing device 108, or other similar input methods. For example, a user at client computing device 102 can utilize a GUI provided by the client device 102 to select and/or input the user data 107a (e.g. directly and/or as a computer file) for transmission to the data store 106. The user data 107a includes one or more attributes of a user (e.g., an employee, consultant, etc.) of one or more computing resources in the IT architecture. For example, the attributes can include data elements such as a job role of the user, a job title of the user, a job function of the user, a manager of the user, an organization or business unit to which the user is assigned, and the like. As will be described below, some or all of these data elements can help define which computing resources in the IT architecture that the user should or should not have access to. In one example, each user has a user profile stored in the user data 107a and the user profile includes the attributes identified above and in some cases, other attributes such as demographic information, user identification information (e.g., ID number), and so forth.

The entitlement data 107b is stored by the data store 106 via input from a web site/web page, from a computer file (e.g., XML, CSV, TXT), from an application programming interface (API) coupled to another computing system (e.g., IT access control system 118), from an application executing on the client device 102 and/or the server computing device 108, or other similar input methods. For example, a user at client computing device 102 can utilize a GUI provided by the client device 102 to select and/or input the entitlement data 107b (e.g. directly and/or as a computer file) for transmission to the data store 106. The entitlement data 107b includes one or more attributes of an entitlement (e.g., ability to access) for one or more computing resources in the IT architecture. For example, the attributes can include data elements such as a name of the entitlement, a description of the entitlement, one or more flags that indicate if the IT entitlement maps to a privileged access, an application to which the entitlement relates, a computing system to which the entitlement relates, and the like. As will be described below, some or all of these data elements can help define which computing resources in the IT architecture are accessible by certain users of the IT architecture.

The user entitlement recommendation data 116a is generated via the processing of the engines 110, 112, 114 on the user data 107a and the entitlement data 107b, as will be described in greater detail below. In some embodiments, the user entitlement recommendation data 116a represents a set of entitlements to certain computing resources in the IT architecture for a particular user or a plurality of users (i.e., User A is entitled to access Computing Resource M, users in group X are entitled to access Computing Resource K, etc.) generated by the engines 110, 112, 114. The recommendation data 116a can be used to generate unique visualization graphs and similar representations of the data to a user at client device 102 via display device 103.

The entitlement discrepancy data 116b is generated via the processing of the engines 110, 112, 114 on the user data 107a and the entitlement data 107b, as will be described in greater detail below. In some embodiments, the entitlement discrepancy data 116b represents one or more differences between existing user entitlements to certain computing resources in the IT architecture and (i) recommended entitlements generated by the engines 110, 112, 114 and/or (ii) existing entitlements of groups of users that are similar to a user in a certain aspect (e.g., User A has a similar or same job function as a group of users that are assigned an entitlement to access Computing Resource L). In this way, the entitlement discrepancy data 116b is useful to identify potential and/or actual security risks to the IT architecture as a result of entitlements that are excessive in relation to similar users or existing entitlements. The entitlement discrepancy data 116b is also useful to identify combinations of users and entitlements that may violate, e.g., enterprise-wide access control policies, access privilege principles, and so forth. The entitlement discrepancy data 116b can be used to generate unique visualization graphs and similar representations of the data to a user at client device 102 via display device 103.

The server computing device 108 is coupled to an IT access control system 118, which manages the access request and review processes associated with the IT infrastructure for, e.g., an organization. The IT access control system 118 receives certain information, including user entitlement recommendation data 116a and entitlement discrepancy data 116b, from the server computing device 108 and integrates the data 116a, 116b with existing IT resource access procedures in order to generate actionable instructions and workflows to adjust existing access permissions and conduct detailed reviews of access permissions in order to mitigate and prevent potential security risks. For example, the IT access control system 118 can analyze the recommendation data 116a and the discrepancy data 116b to generate programmatic instructions (e.g., updates to database tables governing IT access permissions, approving and/or rejecting subsequent access requests received from remote computing devices, identifying and/or carrying out changes to user interface elements, automatically executing reviews of user profiles, and the like) for execution by the system 118 in order to implement the recommendations and remedy the discrepancies identified by the modules 110, 112, 114 of the server computing device 108 as described herein.

Figure 2:
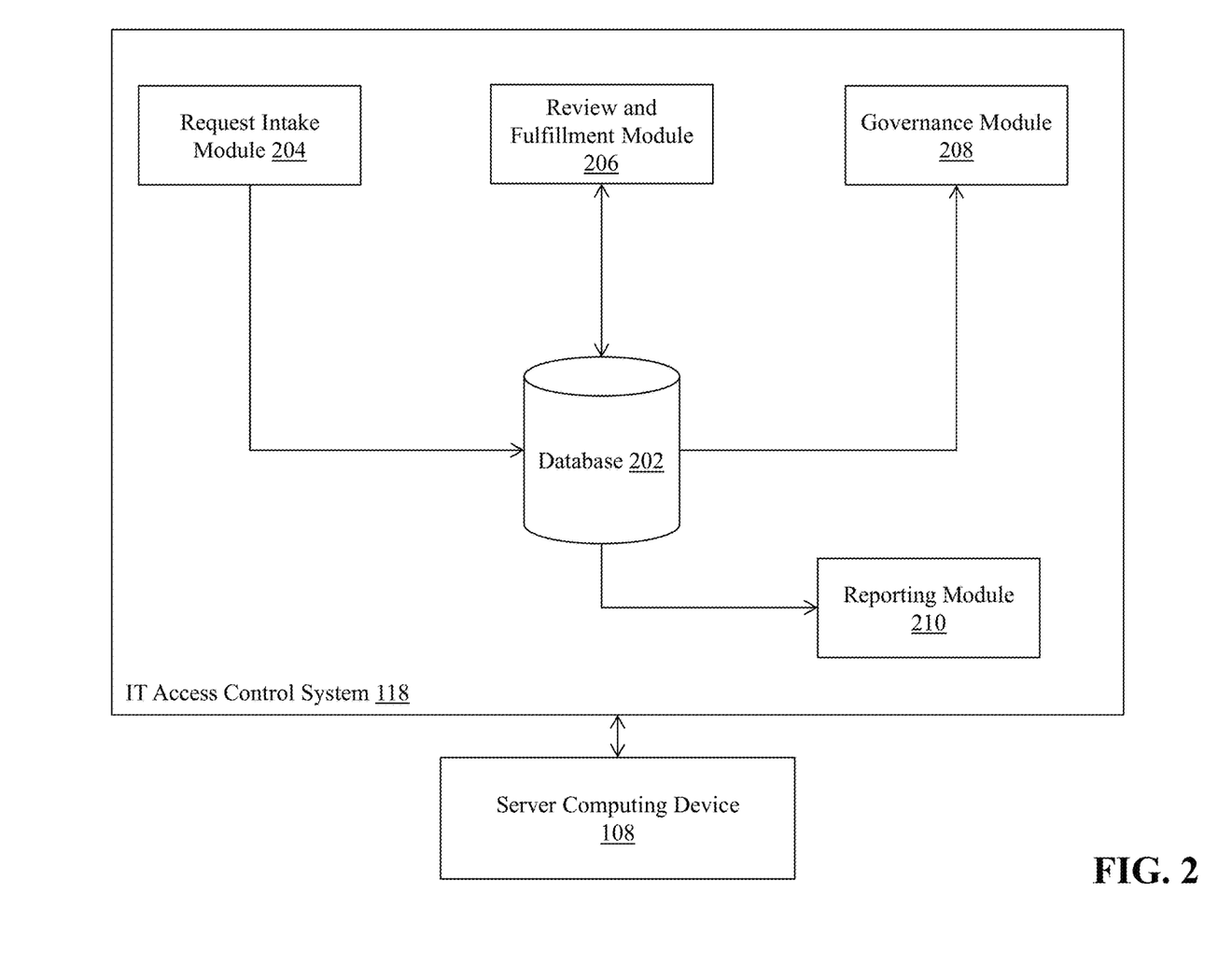
FIG. 2 is a detailed block diagram of an IT access control system.

FIG. 2 is a detailed block diagram of an embodiment of the IT access control system 118. As shown in FIG. 2, the IT access control system 118 includes a request/review database 202 that is coupled to several modules 204, 206, 208, 210 that each corresponds to a particular function of the IT access control system. In some embodiments, the modules 204, 206, 208, 210 are specialized sets of computer software instructions programmed onto a dedicated processor in a server computing device of the IT access control system 118, and can include specifically-designated memory locations and/or registers for executing the specialized computer software instructions For example, the request intake module 204 is configured to receive IT access requests (e.g., a user would like to gain access to a particular IT resource) from client computing devices. The IT access requests can include data elements that define the scope and parameters of the access request, including type of request, resource requested, justification for the request, and so forth. The request intake module 204 passes the incoming requests to the database 202.

The review and fulfillment module 206 retrieves the incoming access requests from database 202 and executes one or more access workflow processes to, e.g., determine whether the request should be approved (based upon the data elements of the request, and based upon the recommendation data 116a/discrepancy data 116b received from the server computing device 108) and to identify and provision specific IT assets and resources that are called out in the request. The review and fulfillment module 206 executes the workflow processes and updates necessary tables in database 202 to reflect the changed IT access permissions based upon evaluation of the access request.

The governance module 208 retrieves IT access control permissions and related data from database 202 to identify and manage, e.g., special permissions such as privileged access, access appropriate to role (AATR), and user access for individuals that may be outside the organization.

The IT access control system 118 also includes a reporting module 210 that extracts data from database 202 regarding IT access control permissions (e.g., for groups of users/specific users) and generates reports for review by system administrators to determine the scope of existing access permissions, to identify potential discrepancies or security risks, and the like.

Figure 3:
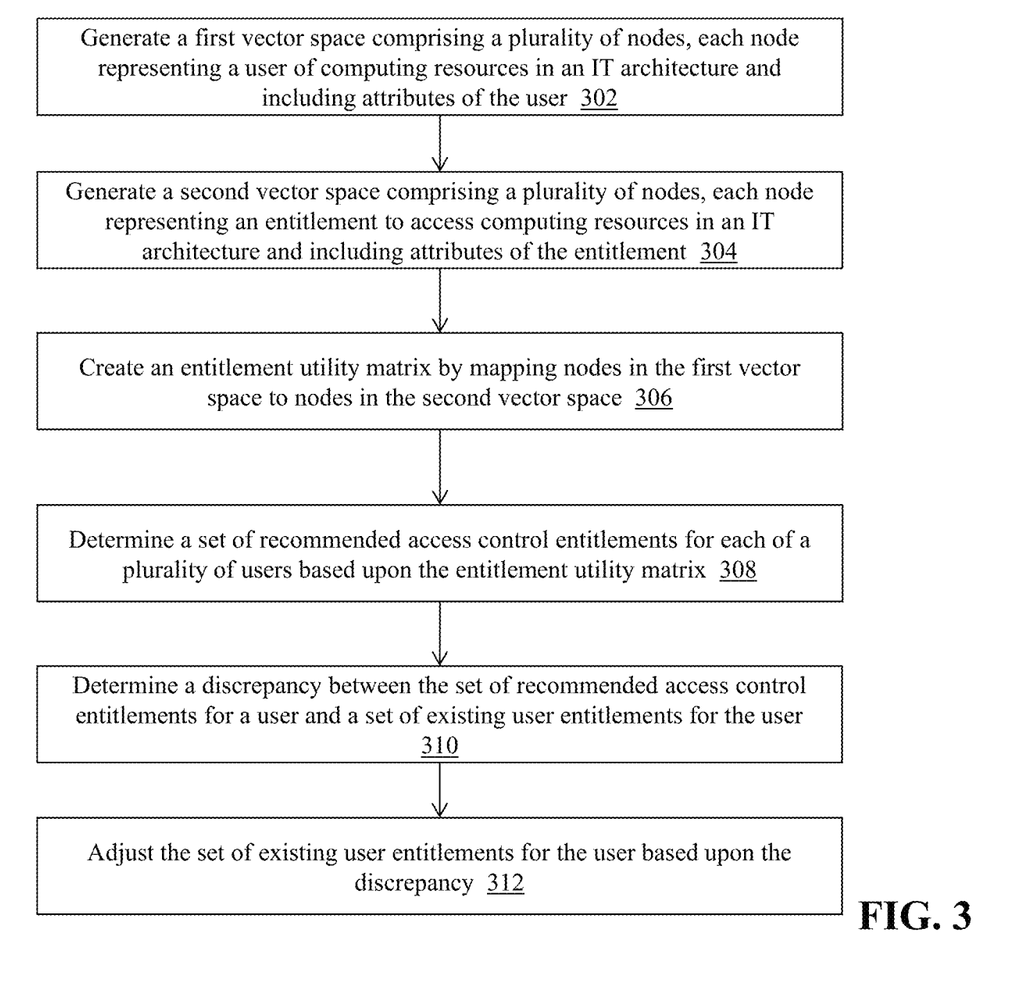
FIG. 3 is a flow diagram of a method of enterprise access control governance in a computerized information technology (IT) architecture.

FIG. 3 is a flow diagram of a method 300 of enterprise access control governance in a computerized information technology (IT) architecture, using the system 100 of FIG. 1. The vector space generation module 110 of server computing device 108 retrieves user data 107a and entitlement data 107b from data store 106. The vector space generation module 110 generates (302) a first vector space, comprising a plurality of nodes using the user data 107a. Each node in the first vector space represents a user of one or more computing resources in the IT architecture, and each node includes one or more attributes of the user, based upon the user data 107a as described previously. For example, the vector space generation module 110 can define a set of data structures (e.g., either stored locally and/or in data store 106) where each data structure comprises data elements corresponding to the attributes for a particular node in the vector space.

The vector space generation module 110 also generates (304) a second vector space comprising a plurality of nodes, using the entitlement data 107b. Each node in the second vector space represents an entitlement to access one or more computing resources in the IT architecture, and each node in this space includes one or more attributes of the entitlement, based upon the entitlement data as described previously.

Figure 4:
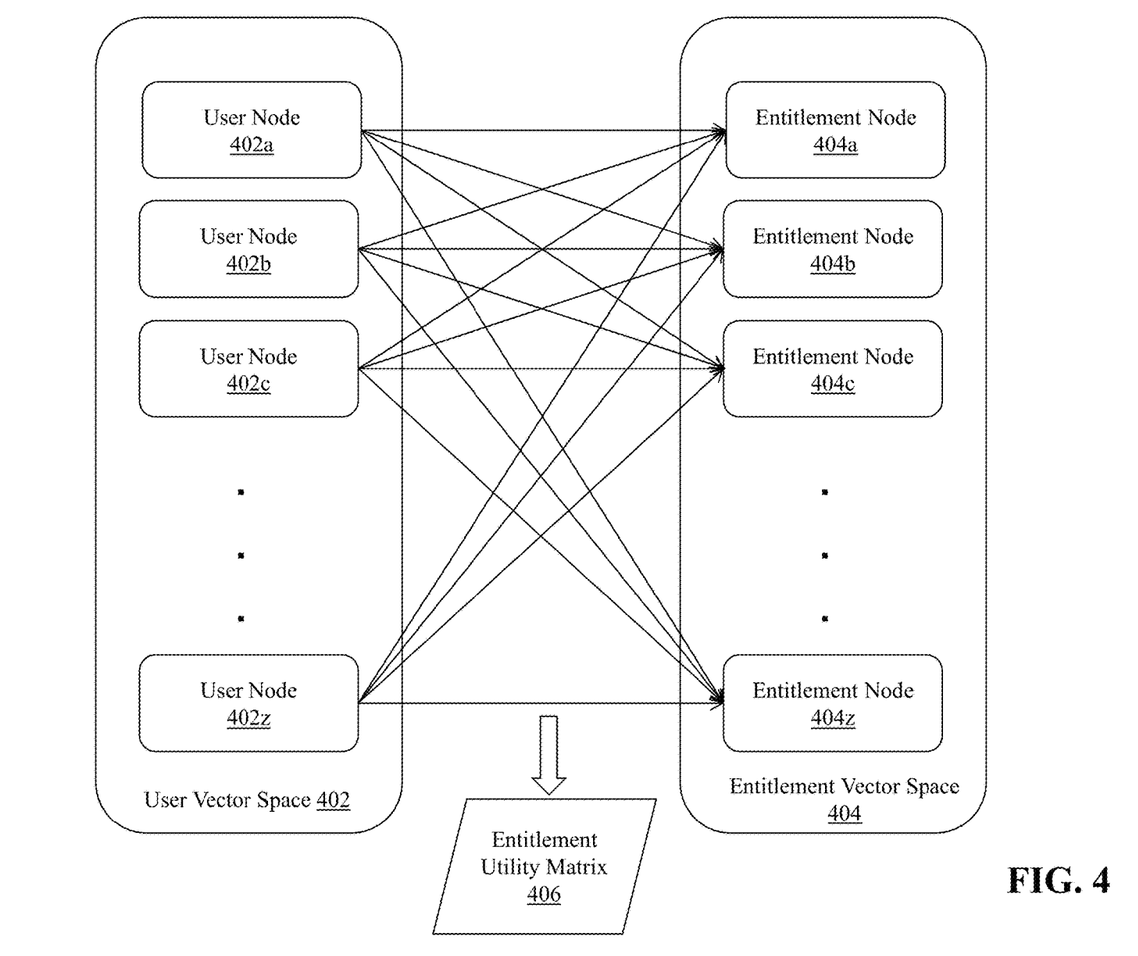
FIG. 4 is a representation of vector spaces as generated by the system.

FIG. 4 is a representation of the first vector space 402 (i.e., the user vector space) and the second vector space 404 (i.e., the entitlement vector space), as generated by the module 110. As shown in FIG. 4, the first vector space comprises a plurality of user nodes 402a-402z corresponding to individual users of the IT architecture. Each user node 402a-402z is a data structure defined by a set of attributes (e.g., user ID, manager, job title, job function, etc.) associated with the particular user it represents. Similarly, the second vector space 404 comprises a plurality of entitlement nodes 404a-404z corresponding to individual IT access entitlements of the IT architecture. Each entitlement node 404a-404z is defined by a set of attributes (e.g., entitlement name, entitlement ID, description, etc.) associated with the particular entitlement it represents. It should be appreciated that the vector spaces 402, 404 can comprise any number of nodes corresponding to particular users of the IT architecture and, in some embodiments, the vector spaces 402, 404 comprise multidimensional vector spaces where user nodes can be connected to each other (e.g., based upon the same or similar attributes of the user nodes) and the entitlement nodes can be connected to each other (e.g., based upon the same or similar attributes of the entitlement nodes).

The entitlement matrix generation module 112 receives the user vector space and the entitlement vector space from the vector space generation module 110. The entitlement matrix generation module 112 creates (306) an entitlement utility matrix by mapping one or more nodes in the first vector space (e.g., nodes 402a-402z in user vector space 402) to one or more nodes in the second vector space (e.g., nodes 404a-404z in entitlement vector space 404) based upon existing user entitlements to access computing resources in the IT architecture. As shown in FIG. 4, each user node 402a-402z is connected to each entitlement node 404a-404z—creating a matrix of relationships between the user nodes and the entitlement nodes. For example, a user node (e.g., node 402a) is mapped to entitlement nodes 404a, 404b, 404c, and 404z. In a preferred embodiment, each node in the user vector space 402 is mapped to each node in the entitlement vector space 404—even where a particular user does not have access to one or more of the entitlements. The vectors between the user nodes and the entitlement nodes can be assigned a value indicating whether the user represented by the user node has or does not have access to the entitlement represented by the connected entitlement node. For example, a vector that is assigned a value of 1 means that the user represented by the user node does have access to the entitlement represented by the connected entitlement mode. And, a vector that is assigned a value of 0 means that the user represented by the user node does not have access to the entitlement represented by the connected entitlement mode.

Also, in some embodiments, the entitlement matrix generation module 112 can assign a weight to the vectors that connect the user nodes and the entitlement nodes. The weight can indicate, e.g., an importance of the user-entitlement relationship, a security risk associated with the user-entitlement relationship, and the like. It should be appreciated that other methods for weighing the vectors can be contemplated within the scope of the systems and methods described herein.

In another embodiment, the user nodes in the user vector space 402 can only be connected to entitlement nodes in the entitlement vector space 404 when the user corresponding to the user node has access to the entitlement corresponding to the connected entitlement node. In this embodiment, the lack of a connection between a user node and an entitlement node indicates that the user does not have access to the entitlement.

The entitlement matrix generation module 112 uses the mappings to generate the entitlement utility matrix for the plurality of users and the plurality of entitlements. In one embodiment, each relationship in the matrix is defined as a binary matrix, where the matrix for User A and Entitlement X (in the case of User A having access to Entitlement X) is:

$$M(userA, entitlementX) = 1$$

and the matrix for User A and Entitlement X (in the case of User A not having access to Entitlement X) is:

$$M(userA, entitlementX) = 0$$

The entitlement matrix generation module 112 generates the entitlement utility matrix by combining each of the relationship matrices described above into a comprehensive utility matrix defining all of the relationships between users and entitlements in the IT architecture. It should be appreciated that other methodologies for generating the utility matrix can be contemplated as within the scope of invention described herein.

The entitlement recommendation and discrepancy identification module 114 receives the entitlement utility matrix from the entitlement matrix generation module 112 and analyzes the utility matrix in several ways, as will be described below. The module 114 determines (308) a set of recommended access control entitlements for each of a plurality of users based upon the entitlement utility matrix. For example, the module 114 can group users based upon, e.g., whether the users share similar attributes (e.g., User A and User B have the same job function), and discover patterns in the entitlement access rights associated with each of the users in the group to generate a recommended set of entitlements for users in the group. In one embodiment, the module 114 uses collaborative filtering techniques to discover the user-entitlement patterns in the utility matrix and then leverages the user vector space to validate and evaluate the results of the collaborative filtering based upon, e.g., the organizational structure and job function of the individual users in the group(s).

Generally, collaborative filtering techniques operate to predict the votes of a particular user (referred to herein as the 'active user') from a database of user votes taken from a sample or population of other users. The user database therefore consists of a set of votes $v_{i,j}$ corresponding to the vote for user i on item j. If $I_i$ is the set of items on which user i has voted, then we can define the mean vote for user i as:

$$\bar{v}_i = \frac{1}{|I_i|} \sum_{j \in I_i} v_{i,j}$$

In memory-based collaborative filtering algorithms, the module 114 predicts votes of the active user (indicated with a subscript a) based on some partial information regarding the active user and a set of weights calculated from the user database. The module 114 assumes that the predicted vote of the active user for item j, $p_{a,j}$, is a weighted sum of the votes from the other users:

$$p_{a,j} = \overline{v}_a + \kappa \sum_{i=1}^{n} w(a,i)(v_{i,j} - \overline{v}_i)$$

where n is the number of users in the collaborative filtering database with non-zero weights. The weights w(a, i) can reflect distance, correlation, or similarity between each user i and the active user. κ is a normalizing factor such that the absolute values of the weights sum to unity.

Below is an exemplary weight calculation:

$$w(a,i) = \sum_{j} \frac{v_{a,j}}{\sqrt{\sum_{k \in I_a} v_{a,k}^2}} \frac{v_{i,j}}{\sqrt{\sum_{k \in I_i} v_{i,k}^2}}$$

where the squared terms in the denominator serve to normalize votes so that users that vote on more titles will not a priori be more similar to other users. Further information on collaborative filtering techniques and algorithms can be found in Breese, John S., et al., "Empirical analysis of predictive algorithms for collaborative filtering," *Proceedings of the Fourteenth Conference on Uncertainty in Artificial Intelligence*, pp. 43-52, Morgan Kaufmann Publishers Inc., 1998, which is incorporated herein by reference.

Also, using the above-referenced collaborative filtering process, the entitlement recommendation and discrepancy identification module 114 determines (310) a first discrepancy between the set of recommended access control entitlements and a set of existing user entitlements for each of the plurality of users. For example, the module 114 can identify that a particular user assigned to a certain job function has been assigned an entitlement to access an IT resource that no other users assigned to the same job function have. As such, the difference in entitlements can be determined as a discrepancy, and assigned a value to indicate, e.g., how much of an outlier the user is from the other group members and/or the entitlement is from the recommended set of entitlements for the user's group or the existing set of entitlements for others in the user's group.

In this way, the module 114 can compute a similarity score for each user based upon a comparison of the user's existing access control entitlements to the recommended set of entitlements for the user, and then aggregate the similarity scores of all users within a defined group (e.g., job role, job function, manager, etc.). The resulting aggregation of similarity scores can then be used as a metric for describing the general "health" of a particular user group based upon how similar the access entitlements are between members of the group. This metric can help administrators identify groups that may have outliers (e.g., users whose entitlements deviate from expected or recommended entitlements), users who have toxic combinations of access that violate organizational requirements or policies, and so forth.

Once the module 114 has determined one or more discrepancies between, e.g., a user and the set of recommended access control entitlements or the set of existing access control entitlements for other users in the same group, the module 114 adjusts (312) the set of existing access control entitlements for the user based upon the discrepancy. For example, the module 114 generates programmatic instructions for adjusting the existing access control requirements (e.g., messages, code, API commands, and so forth) that are transmitted to the IT access control system 118 for execution. In one embodiments, the programmatic instructions comprise a workflow for updating data records and revising permissions in the IT access control system 118 to effect changes that resolve the identified discrepancy. The IT access control system 118 receives the instructions from the module 114 and executes the instructions to alter the access control entitlements for the user (e.g., updating a user profile in database 202). In some embodiments, the module 114 also instructs the entitlement matrix generation module 112 to update the entitlement utility matrix with the changed access control entitlement data resulting from execution of the instructions.

In one embodiment, an exemplary use case is a transferring user. In this case, the system generates a set of entitlements to be used as a current point-in-time baseline access entitlements most relevant for this user, compares the baseline entitlements with the existing entitlements of the user, and sends over a list to, e.g., an information technology provisioning system for automatic provision of any new entitlements as well as a list for removing any existing entitlements not required for the job role to which this user is transferring.

An important and advantageous aspect of the methods and systems described herein is the dynamic approach to visualization of user access control entitlements that the system 100 employs. Using the techniques of generating a utility matrix and collaborative filtering to determine patterns of entitlement access as well as deviations from recommended entitlements or existing entitlements as described above, the system 100 can generate visual representations of the data to provide a robust and innovative user interface for understanding specific aspects of the user-entitlement relationships in an organization—as well as quickly identifying areas that are in need of deeper analysis and remediation to avoid potentially harmful security risks.

Figure 5:
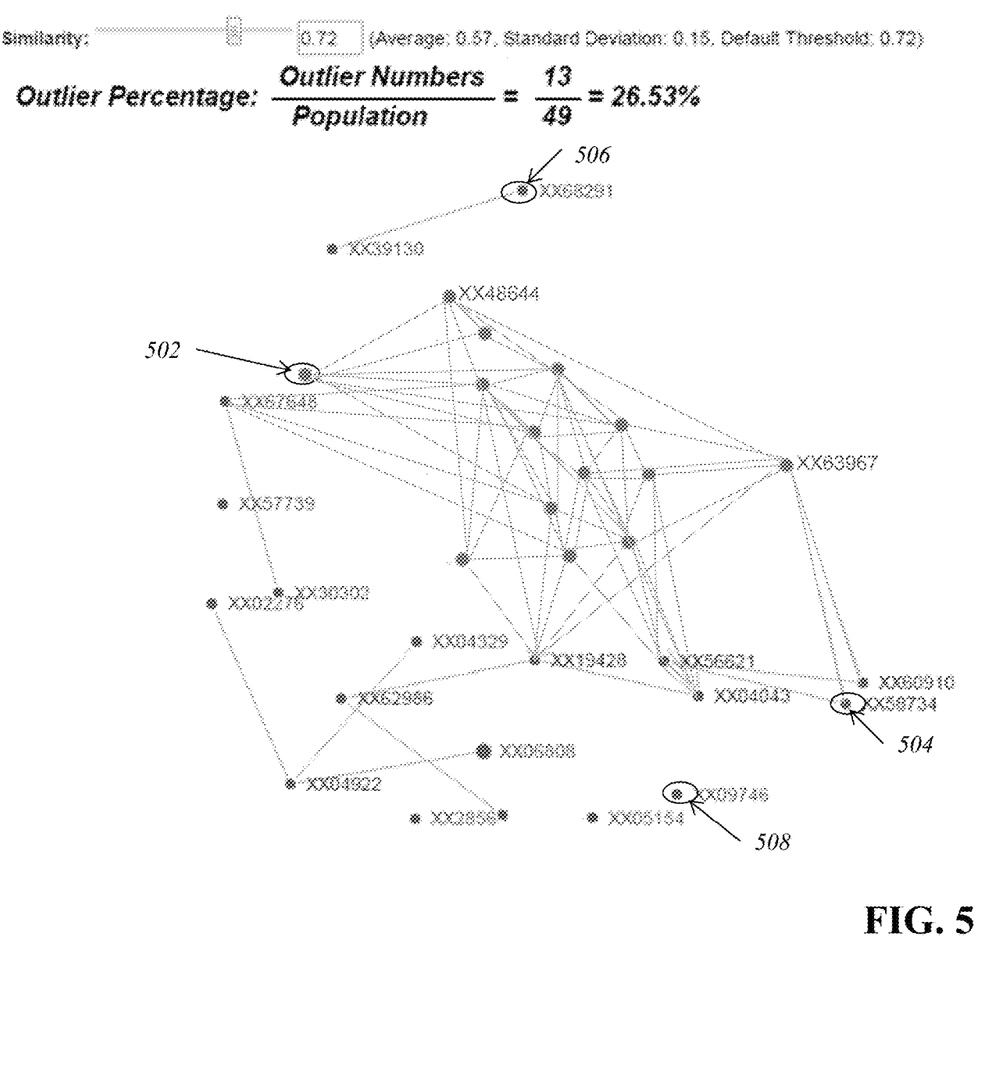
FIG. 5 is a diagram of an exemplary graphical user interface for visualization of user access control entitlements to one or more computing resources in a computerized IT architecture.

FIG. 5 is a diagrams of an exemplary graphical user interface for visualization of user access control entitlements to one or more computing resources in an IT architecture. As shown in FIG. 5, each node in the graph corresponds to a user having one or more entitlements in the IT architecture of an enterprise. The number next to each node is an identifier (e.g., an employee ID) corresponding to that user. All nodes are connected via a line to other nodes which have similar entitlements in the IT architecture at or above a given threshold (as described in [0058]). Additionally, certain nodes (such as circled nodes 502, 504) are shaded in one color (e.g., green)—which indicates that the user's entitlements are within an acceptable range of other users' entitlements, where the other users have the same or similar user attributes. Other nodes (such as circled nodes 506, 508) are shaded in a different color (e.g., red)—indicating that the user's entitlements are not within an acceptable range of similar users' entitlements. These users are considered 'outliers' by the system and may pose a higher security risk to the IT architecture based upon their unusual entitlements. The user interface of FIG. 5 also indicates the number of outliers (e.g., 13) in the total population of users (e.g., 49).

The top of the user interface includes a slider associated with a similarity score between users represented in the graph. An operator can adjust the similarity score using the slider bar to change which nodes/users are considered to be outliers. For example, if the similarity score is set to 0.72, then users that have a similarity score at or above that threshold are shown as 'green' (meaning acceptable entitlement range) while users that have a similarity score below the threshold are shown as 'red' (meaning not acceptable entitlement range). In this way, the operator can quickly set the similarity score at various levels based upon, e.g., operation or organization requirements.

Method steps can be performed by one or more special-purpose processors executing a computer program to perform functions of the invention by operating on input data and/or generating output data. Method steps can also be performed by, and an apparatus can be implemented as, special-purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special-purpose microprocessors. Generally, a processor receives instructions and data from a read-only memory or a random access memory or both. The essential elements of a computer are a specialized processor for executing instructions and one or more specifically-allocated memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier interne protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for enterprise access control governance in a computerized information technology (IT) architecture that provides a plurality of computing resources to a plurality of users, the system comprising:
a plurality of distributed server computing devices that coordinate over a network environment to:
generate a first high-dimensional vector space comprising a plurality of nodes, each node in the first high-dimensional vector space representing a user of one or more computing resources in the IT architecture and including one or more attributes of the user;
generate a second high-dimensional vector space comprising a plurality of nodes, each node in the second high-dimensional vector space representing an entitlement to access one or more computing resources in the IT architecture and including one or more attributes of the entitlement;
create an entitlement utility matrix by mapping one or more nodes in the first high-dimensional vector space to one or more nodes in the second high-dimensional vector space based upon existing user entitlements to access computing resources in the IT architecture, wherein each mapping comprises a connection between a node in the first high-dimensional vector space and a node in the second high-dimensional vector space, the connection assigned a value indicating whether access is granted;
determine a set of recommended access control entitlements for each of a plurality of users based upon the entitlement utility matrix, by analyzing existing access control entitlements for one or more other users, the other users associated with the user through a distance value;
determine a first discrepancy between the set of recommended access control entitlements for at least one of the plurality of users and a set of existing user entitlements for that user;
determine a level of security risk to the IT architecture associated with the first discrepancy by the set of existing user entitlements for the user;
generate a visualization graph depicting the level of security risk to the IT architecture associated with the first discrepancy, the visualization graph comparing the set of existing user entitlements in relation to the set of recommended access control entitlements, and display the visualization graph on a display device coupled to the plurality of distributed server computing devices; and
adjust the set of existing user entitlements for the at least one of the plurality of users based upon the level of security risk by generating programmatic instructions that are transmitted to each of a plurality of computing resources in an information technology (IT) access control system, wherein each of the plurality of computing resources executes the programmatic instructions to alter data structures that govern user access control entitlements, resulting in a reduced level of security risk for the IT architecture.

2. The system of claim 1, wherein when determining the set of recommended access control entitlements for the plurality of users, the plurality of distributed server computing devices:
determines a second discrepancy between the set of existing user entitlements for at least one of the plurality of users and a set of existing access control entitlements for a group of other users that share at least one attribute with that user, as represented in the entitlement utility matrix;
determines a second level of security risk to the IT architecture associated with the second discrepancy by the set of existing user entitlements for the user; and
generates the set of recommended access control entitlements for the at least one of the plurality of users based upon the second level of security risk.

3. The system of claim 1, wherein the first discrepancy comprises an entitlement in the set of existing user entitlements for the at least one of the plurality of users that is not included in the set of recommended access control entitlements for that user.

4. The system of claim 1, wherein the first discrepancy comprises an entitlement in the set of recommended access control entitlements for the at least one of the plurality of users that is not included in the set of existing user entitlements for that user.

5. The system of claim 1, wherein the first discrepancy comprises a difference between a value assigned to an entitlement in the set of existing user entitlements for the at least one of the plurality of users and a value assigned to an entitlement in the set of recommended access control entitlements for the at least one of the plurality of users.

6. The system of claim 1, wherein the one or more attributes of the user include: a job function of the user, a job role of the user, a title of the user, a manager to which the user is assigned, a business unit to which the user is assigned, and an organization to which the user is assigned.

7. The system of claim 1, wherein the one or more attributes of the entitlement include: a name of the entitlement, a description of the entitlement, one or more privileged access flags, an application to which the entitlement is assigned, and a computing system to which the entitlement is assigned.

8. The system of claim 1, wherein the entitlement utility matrix comprises a binary matrix including a value for each user-entitlement combination that indicates whether a user has access to an entitlement.

9. The system of claim 1, wherein the plurality of distributed server computing devices:
add a new node to the first high-dimensional vector space, wherein the new node represents a new user of one or more computing resources in the IT architecture and including one or more attributes of the new user;
create an updated entitlement utility matrix by mapping the new node in the first high-dimensional vector space to one or more nodes in the second vector high-dimensional space based upon a set of recommended access control entitlements of another user that shares at least one attribute with the new user;
determine a set of recommended access control entitlements for the new user based upon the entitlement utility matrix, by automatically discovering user-entitlement patterns in the entitlement utility matrix through collaborative filtering by predicting a set of access control entitlements for the new user based upon existing access control entitlements for one or more other users, the other users associated with the new user through a distance value; and
store the set of recommended access control entitlements for the new user.

10. The system of claim 1, wherein the plurality of distributed server computing devices:
generate a second visualization graph depicting existing user entitlements for a plurality of users and one or more discrepancies between the existing user entitlements for the plurality of users and recommended access control entitlements for the plurality of users, the second visualization graph comprising a plurality of nodes each representing a user of the plurality of users, each node colored to indicate whether the corresponding user's access control entitlements are within an acceptable range of other similar users' access control entitlements, and each node connected to other nodes that correspond to users that have similar access control entitlements; and
display the second visualization graph on a display device coupled to the plurality of distributed server computing devices.

11. A computerized method of enterprise access control governance in a computerized information technology (IT) architecture that provides a plurality of computing resources to a plurality of users, the method comprising:
generating, by a plurality of distributed server computing devices that coordinate in a network environment, a first high-dimensional vector space comprising a plurality of nodes, each node in the first high-dimensional vector space representing a user of one or more computing resources in the IT architecture and including one or more attributes of the user;
generating, by the plurality of distributed server computing devices, a second high-dimensional vector space comprising a plurality of nodes, each node in the second high-dimensional vector space representing an entitlement to access one or more computing resources in the IT architecture and including one or more attributes of the entitlement;
creating, by the plurality of distributed server computing devices, an entitlement utility matrix by mapping one or more nodes in the first high-dimensional vector space to one or more nodes in the second high-dimensional vector space based upon existing user entitlements to access computing resources in the IT architecture, wherein each mapping comprises a connection between a node in the first high-dimensional vector space and a node in the second high-dimensional vector space, the connection assigned a value indicating whether access is granted;
determining, by the plurality of distributed server computing devices, a set of recommended access control entitlements for each of a plurality of users based upon the entitlement utility matrix, by analyzing existing access control entitlements for one or more other users, the other users associated with the user through a distance value;
determining, by the plurality of distributed server computing devices, a first discrepancy between the set of recommended access control entitlements for at least one of the plurality of users and a set of existing user entitlements for that user;
determining, by the plurality of distributed server computing devices, a level of security risk to the IT architecture associated with the first discrepancy by the set of existing user entitlements for the user;
generating, by the plurality of distributed server computing devices, a visualization graph depicting the level of security risk to the IT architecture associated with the first discrepancy, the visualization graph comparing the set of existing user entitlements in relation to the set of recommended access control entitlements, and display the visualization graph on a display device coupled to the plurality of distributed server computing devices; and
adjusting, by the plurality of distributed server computing devices, the set of existing user entitlements for the at least one of the plurality of users based upon the level of security risk by generating programmatic instructions that are transmitted to each of a plurality of computing resources in an information technology (IT) access control system, wherein each of the plurality of computing resources executes the programmatic instructions to alter data structures that govern user access control entitlements, resulting in a reduced level of security risk for the IT architecture.

12. The method of claim 11, wherein the step of determining the set of recommended access control entitlements for the plurality of users comprises:
determining, by the plurality of distributed server computing devices, a second discrepancy between the set of existing user entitlements for at least one of the plurality of users and a set of existing access control entitlements for a group of other users that share at least one attribute with that user, as represented in the entitlement utility matrix; and
generating, by the server computing device, the set of recommended access control entitlements for the at least one of the plurality of users based upon the second discrepancy.

13. The method of claim 11, wherein the first discrepancy comprises an entitlement in the set of existing user entitlements for the at least one of the plurality of users that is not included in the set of recommended access control entitlements for that user.

14. The method of claim 11, wherein the first discrepancy comprises an entitlement in the set of recommended access control entitlements for the at least one of the plurality of users that is not included in the set of existing user entitlements for that user.

15. The method of claim 11, wherein the first discrepancy comprises a difference between a value assigned to an entitlement in the set of existing user entitlements for the at least one of the plurality of users and a value assigned to an entitlement in the set of recommended access control entitlements for the at least one of the plurality of users.

16. The method of claim 11, wherein the one or more attributes of the user include: a job function of the user, a job role of the user, a title of the user, a manager to which the user is assigned, a business unit to which the user is assigned, and an organization to which the user is assigned.

17. The method of claim 11, wherein the one or more attributes of the entitlement include: a name of the entitlement, a description of the entitlement, one or more privileged access flags, an application to which the entitlement is assigned, and a computing system to which the entitlement is assigned.

18. The method of claim 11, wherein the entitlement utility matrix comprises a binary matrix including a value for each user-entitlement combination that indicates whether a user has access to an entitlement.

19. The method of claim 11, further comprising:
adding, by the plurality of distributed server computing devices, a new node to the first high-dimensional vector space, wherein the new node represents a new user of one or more computing resources in the IT architecture and including one or more attributes of the new user;
creating, by the plurality of distributed server computing devices, an updated entitlement utility matrix by mapping the new node in the first high-dimensional vector space to one or more nodes in the second high-dimensional vector space based upon a set of recommended access control entitlements of another user that shares at least one attribute with the new user;

determining, by the plurality of distributed server computing devices, a set of recommended access control entitlements for the new user based upon the entitlement utility matrix, by automatically discovering user-entitlement patterns in the entitlement utility matrix through collaborative filtering by predicting a set of access control entitlements for the new user based upon existing access control entitlements for one or more other users, the other users associated with the new user through a distance value; and storing, by the plurality of distributed server computing devices, the set of recommended access control entitlements for the new user.

20. The method of claim 11, further comprising:

generating, by the plurality of distributed server computing devices, a second visualization graph depicting existing user entitlements for a plurality of users and one or more discrepancies between the existing user entitlements for the plurality of users and recommended access control entitlements for the plurality of users, the second visualization graph comprising a plurality of nodes each representing a user of the plurality of users, each node colored to indicate whether the corresponding user's access control entitlements are within an acceptable range of other similar users' access control entitlements, and each node connected to other nodes that correspond to users that have similar access control entitlements; and displaying, by the plurality of distributed server computing devices, the second visualization graph on a display device coupled to the plurality of distributed server computing devices.

* * * * *